United States Patent
Barry et al.

(10) Patent No.: US 7,389,285 B2
(45) Date of Patent: Jun. 17, 2008

(54) PROCESS FOR DISTRIBUTED PRODUCTION AND PEER-TO-PEER CONSOLIDATION OF SUBJECTIVE RATINGS ACROSS AD-HOC NETWORKS

(75) Inventors: Patrick Adam Barry, Burlington, NC (US); Heather Jean Hartman, Arnold, MD (US); Joshua Howard Levy, Durham, NC (US); Shelley Saxena, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 461 days.

(21) Appl. No.: 10/762,700

(22) Filed: Jan. 22, 2004

(65) Prior Publication Data

US 2005/0165832 A1    Jul. 28, 2005

(51) Int. Cl.
*G06F 17/30* (2006.01)
*G06F 7/00* (2006.01)

(52) U.S. Cl. .................. 707/3; 707/10; 707/100; 707/102; 707/104.1; 705/10

(58) Field of Classification Search .......... 707/1–3, 707/10, 104.1, 100, 102, 103; 705/27, 10
See application file for complete search history.

(56) References Cited

U.S. PATENT DOCUMENTS

| | | | | |
|---|---|---|---|---|
| 5,884,282 | A * | 3/1999 | Robinson | 705/27 |
| 5,983,214 | A | 11/1999 | Lang et al. | 707/1 |
| 6,029,195 | A | 2/2000 | Herz | 709/219 |
| 6,112,186 | A * | 8/2000 | Bergh et al. | 705/10 |
| 6,308,175 | B1 | 10/2001 | Lang et al. | 707/10 |
| 6,317,718 | B1 * | 11/2001 | Fano | 705/1 |
| 6,317,881 | B1 * | 11/2001 | Shah-Nazaroff et al. | 725/24 |
| 6,438,579 | B1 * | 8/2002 | Hosken | 709/203 |
| 6,631,184 | B1 * | 10/2003 | Weiner | 379/92.01 |
| 6,947,922 | B1 * | 9/2005 | Glance | 707/3 |
| 7,072,886 | B2 * | 7/2006 | Salmenkaita et al. | 707/4 |
| 7,082,365 | B2 * | 7/2006 | Sheha et al. | 701/209 |
| 2001/0005847 | A1 | 6/2001 | Wachtel | 707/1 |
| 2002/0087632 | A1 * | 7/2002 | Keskar | 709/204 |
| 2002/0116291 | A1 * | 8/2002 | Grasso et al. | 705/27 |

(Continued)

FOREIGN PATENT DOCUMENTS

WO    WO 01/46843    6/2001

OTHER PUBLICATIONS

Resnick et al., "GroupLens: An Open Architecture for Collaborative Filtering of Netnews", Proceedings of ACM 1994 Conference on Computer Supported Cooperative Work, Chapel Hill, NC, pp. 175-186.

(Continued)

*Primary Examiner*—John Cottingham
*Assistant Examiner*—Susan F Rayyan
(74) *Attorney, Agent, or Firm*—Duke W. Yee; Martin McKinley; Gerald H. Glanzman

(57) ABSTRACT

A rating program on a mobile computing device communicates with other mobile devices regarding collected ratings. A user enters ratings and requests for information; the mobile computing device will then operate in the background, actively scanning for other users with the same type of short-range communications and a ratings program. The devices are able to exchange and save ratings, providing a mobile, socially-relevant means of collecting information.

8 Claims, 2 Drawing Sheets

U.S. PATENT DOCUMENTS

| | | | |
|---|---|---|---|
| 2002/0138471 A1* | 9/2002 | Dutta et al. | 707/3 |
| 2003/0028585 A1 | 2/2003 | Yeager et al. | 709/201 |
| 2003/0055898 A1 | 3/2003 | Yeager et al. | 709/205 |
| 2003/0149612 A1* | 8/2003 | Berghofer et al. | 705/10 |
| 2003/0187794 A1* | 10/2003 | Irwin et al. | 705/40 |
| 2004/0002920 A1* | 1/2004 | Prohel et al. | 705/51 |
| 2004/0031058 A1* | 2/2004 | Reisman | 725/112 |
| 2004/0054572 A1* | 3/2004 | Oldale et al. | 705/10 |
| 2004/0105534 A1* | 6/2004 | Dezonno | 379/114.13 |
| 2004/0153373 A1* | 8/2004 | Song et al. | 705/26 |
| 2004/0225577 A1* | 11/2004 | Robinson | 705/26 |
| 2006/0156337 A1* | 7/2006 | Thelen et al. | 725/46 |

OTHER PUBLICATIONS

Hodes et al., "Composable Ad Hoc Location-Based Services for Heterogeneous Mobile Clients", Wireless Networks 5, 1999, pp. 411-427.

Liu et al., "Information-Directed Routing in Ad Hoc Sensor Networks", 2003 ACM, WSNA'03, Sep. 19, 2003, San Diego, CA, USA, pp. 88-97.

Goldman et al., "Optimizing Information Exchange in Cooperative Multi-Agent Systems", 2003 ACM, AAMAS'03, Jul. 14-18, 2003, Melbourne, Australia, pp. 137-144.

van der Mei et al., "Response Times in a Two-Node Queueing Network with Feedback", Performance Evaluation, vol. 49, No. 1-4, pp. 99-110, Sep. 2002.

Carter et al., "Just-In-Time Information Sharing Architecture in Multiagent", Proceedings of the First International Joint Conference on Autonomous Agents and Multiagent Systems, pp. 647-654, New York, NY, USA, 2002.

* cited by examiner

PROCESS FOR DISTRIBUTED PRODUCTION AND PEER-TO-PEER CONSOLIDATION OF SUBJECTIVE RATINGS ACROSS AD-HOC NETWORKS

BACKGROUND OF THE INVENTION

1. Technical Field

This application relates generally to the dissemination of subjective information, i.e., opinions or ratings of products or services. More specifically this application relates to a means by which a user can collect subjective opinions from persons perceived to be peers who are located within a given distance of the user.

2. Description of Related Art

In our largely urban, mobile culture, people encounter a huge amount of information about the many choices they can make—books, movies, restaurants, museums, people to date—often without a means of filtering this information with regard to their own preferences. Sometimes vendors offering products or services attempt to meet this need by providing a review system. For example, an online book vendor allows users to rate and give comments about books they have read. The separate, individual reviews are then aggregated to provide an average response, giving a potential user an idea of whether or not they might wish to purchase the book. This review system is kept in a centralized location by the vendor and is available to anyone who wants to rate the book. Additionally, the vendor can make suggestions about books a user may be interested in. These suggestions generally rely on either the users previous history (what they look at, what they purchase) and/or on the history of other users who have purchased similar books. Of course, books are only a single item; this type of rating service can also be used with any other type of merchandise or service.

However, these rating systems are not able to offer a more personalized approach because of their centralized nature. For example, it is well know that not everyone's tastes are the same. Most people are much more likely to utilize the opinion of someone whose tastes are similar to their own, rather than someone who is perceived as having very different tastes. For example, the people one encounters at a favorite restaurant would probably be better suited to recommend other good restaurants than the general populace would, especially if the fellow customers also rate the favorite restaurant highly. In a similar vein, people who dislike a movie that one disliked may be able to warn you away from other movies of a like type.

Thus, it would be desirable to have a method and device by which ratings can be requested among ad-hoc groups of people to provide a more reliable, personalized rating system.

SUMMARY OF THE INVENTION

A rating program is installed on a variety of mobile computing devices, such as personal digital assistants (PDAs), laptop computers, mobile telephones, etc. that contain a short-range transmission device, such as Bluetooth or WiFi. The rating program contains a number of categories, such as movies, restaurants, books, museums, people, etc. User A can enter ratings for items in these categories, which are then stored on the mobile computing device. User A can also enter requests for ratings about items or categories that the user is unfamiliar with. The mobile computing device will then operate in the background, actively scanning for other users who share the same type of short-range communication device. When User A encounters User B, who also utilizes the rating program, their devices are able to communicate with each other regarding ratings. The users can each designate a policy that determines the conditions under which the ratings of another user will be accepted. If the policy of User A allows receipt of User B's ratings, the saved ratings for User B are forwarded in all categories in which User B has ratings and User A has either ratings or an indicated desire for information. The received ratings are weighted according to the similarity of overall ratings between User A and User B, so that a higher weight is given to those with similar tastes. The users can thereby collect desired information as they go through their day.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
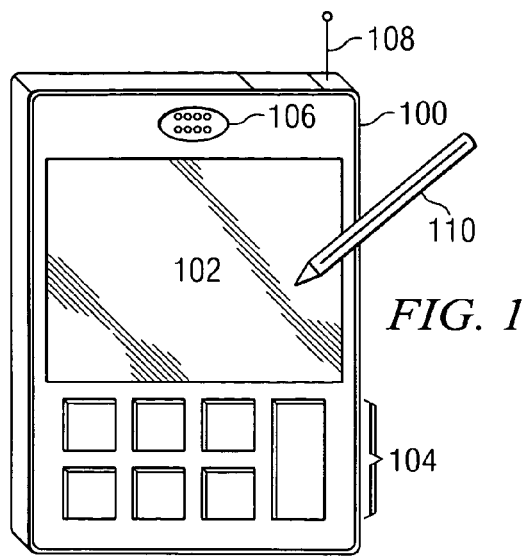
FIG. 1 discloses a personal digital assistant (PDA) in accordance with an embodiment of the present invention.

With reference now to FIG. 1, a diagram of a personal digital assistant (PDA) is depicted in accordance with a preferred embodiment of the present invention. PDA 100 includes a display 102 for presenting textual and graphical information. Display 102 may be a known display device, such as a liquid crystal display (LCD) device. The display may be used to present a map or directions, calendar information, a telephone directory, or an electronic mail message. In these examples, screen 102 may receive user input using an input device such as, for example, stylus 110.

PDA 100 may also include keypad 104, speaker 106, and antenna 108. Keypad 104 may be used to receive user input in addition to using screen 102. Speaker 106 provides a mechanism for audio output, such as presentation of an audio file. Antenna 108 provides a mechanism used in establishing a wireless communications link between PDA 100 and another wireless device that is within range of PDA 100. PDA 100 also preferably includes a graphical user interface that may be implemented by means of systems software residing in computer readable media in operation within PDA 100.

Figure 2:
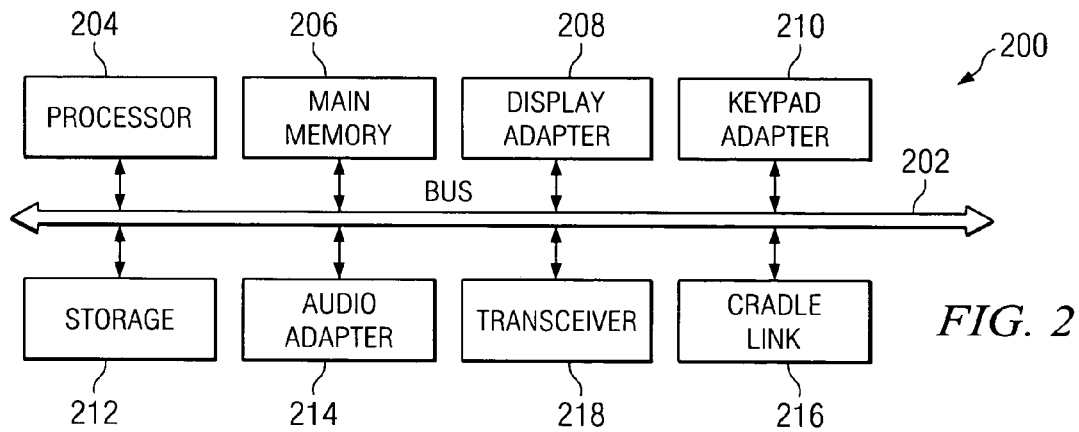
FIG. 2 discloses a block diagram of a PDA in accordance with a preferred embodiment of the present invention.

Turning now to FIG. 2, a block diagram of a PDA is shown in accordance with a preferred embodiment of the present invention. PDA 200 is an example of a PDA, such as PDA 100 in FIG. 1, in which code or instructions implementing the processes of the present invention may be located. PDA 200 includes a bus 202 to which processor 204 and main memory 206 are connected. Display adapter 208, keypad adapter 210, storage 212, audio adapter 214, and transceiver 218 also are connected to bus 202. Cradle link 216 provides a mechanism to connect PDA 200 to a cradle used in synchronizing data in PDA 200 with another data processing system. Further, display adapter 208 also includes a mechanism to receive user input from a stylus when a touch screen display is employed.

An operating system runs on processor 204 and is used to coordinate and provide control of various components within PDA 200 in FIG. 2. The operating system may be, for example, a commercially available operating system such as Windows CE, which is available from Microsoft Corporation. Instructions for the operating system and applications or programs are located on storage devices, such as storage 212, and may be loaded into main memory 206 for execution by processor 204.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2.

General Flow of Data Collection

Before looking at several specific embodiments of the inventive method, it is helpful to look at the general flow, which can be best explained with reference to FIG. 3. The information collected is organized in categories. These categories can be predefined, such as art, movies, restaurants, etc., with subcategories beneath them, such as Chinese, steakhouses, Italian, etc. under restaurants. Within each category or subcategory, any number of items can be entered. It will be understood that an entry can stand for a physical item (e.g., a book), an attraction or place (e.g., a museum), a service (e.g., restaurant or hairdresser), or a person. While the discussion will refer to an "item", it should be understood that the item might not be a physical thing.

Figure 3:
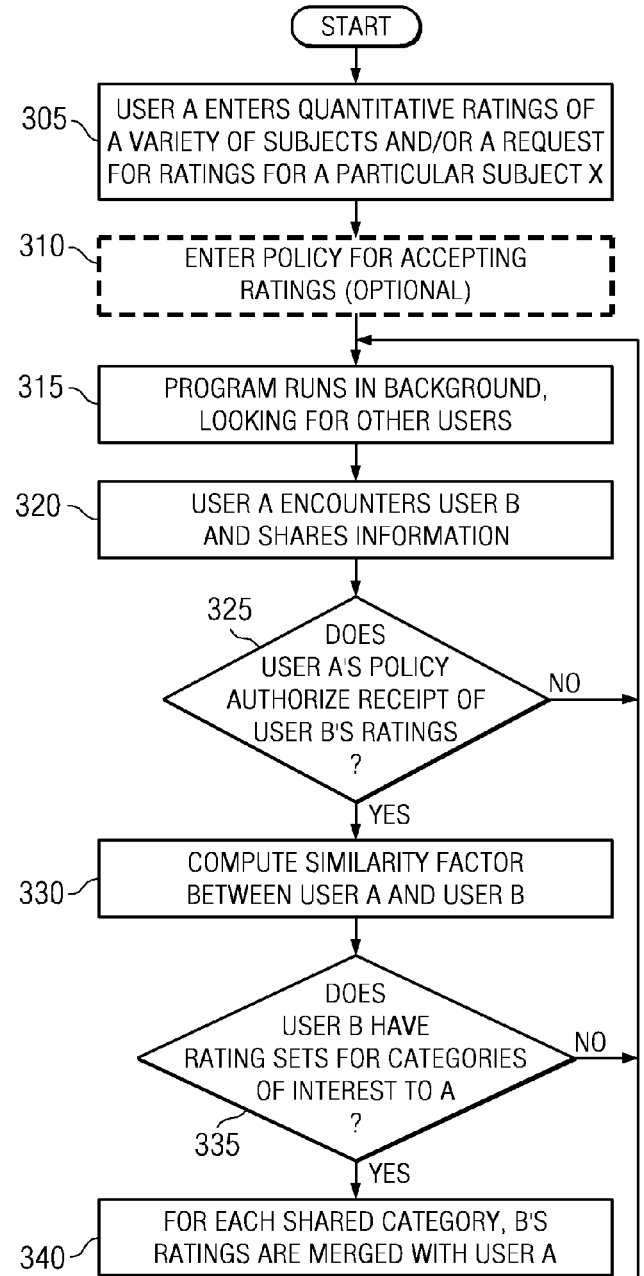
FIG. 3 discloses a flowchart of the use of the ratings program.

The flow in FIG. 3 begins with a new user, whom we shall refer to as User A. User A has just acquired a new PDA, such as is shown in FIG. 1, and has installed the innovative rating program into the PDA. User A then enters ratings for as many items in as many categories as he desires. Additionally, User A can enter an item in which he is interested in receiving information about (step 305). For example, User A eats out frequently. He enters ratings for a number of restaurants that he frequents, perhaps a few that he dislikes, and also enters the name of a new restaurant, hoping to receive information on this new restaurant so that he can decide whether to visit it. User A can come back to this step whenever he desires, although this ability is not specifically shown.

In at least some embodiments, User A can also enter a policy for collecting information (step 310), although other embodiments can have a built-in policy. For example, a policy could be set to not accept input from a user or device that has provided input within the last six months. This precludes the possibility that one person that User A encounters often can heavily bias the data.

Alternatively, the user might designate that information for a given category, for example, restaurants, is only collected during certain hours, e.g., at times that the user is generally dining out. This would tend to collect additional information from persons who tended to enjoy the same food that the user does. The policy might also give a degree of similarity that must be met between User A and another user before input will be accepted from that user. Such a degree of similarity could be computed from a hash of each user's responses.

The program then begins periodically broadcasting a request for information and listening for the broadcast from other users (step 315). At some point, User A will encounter another user of the ratings program, whom we shall designate User B. After a handshake protocol, the two users' programs exchange at least some information (step 320). In one embodiment, a copy of each other's entire rating set can be exchanged for processing. In other embodiments, the two users can exchange only basic identification and perhaps the hash value of their interests. In this embodiment, the remaining information is transferred after the policies are checked (not specifically shown). The program checks whether or not to accept the new user's ratings (step 325).

If the policy is not met (answer=no), the current information from User B will be ignored and the program returns to running in background mode (go to step 315). If the policy accepts the new information (answer=yes), the program proceeds by calculating the similarity S between the profiles for User A and User B (step 330). The program then examines User B's information for rated items in categories that match categories rated or requested by User A (step 335). If there are none (answer=no), the new information is again rejected and the program returns to background mode (go to step 315). If, however, there are categories in common (answer=yes), the ratings from User B are incorporated into User A's ratings (step 340). The exact manner in which the ratings are incorporated can be dependent on the specific embodiment. When this is completed, the program returns to background mode (go to step 315).

First Exemplary Embodiment

Figure 4:
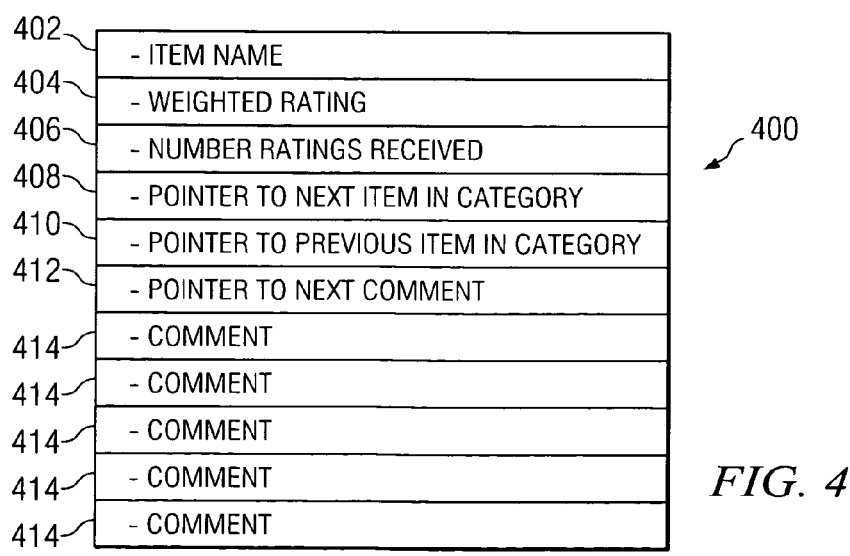
FIG. 4 depicts an exemplary record for an item in an embodiment of the innovative rating program.

Turning now to FIG. 4, record 400 is shown. This record 400 stores ratings and comments for a single entry in the ratings program according to an exemplary embodiment of the invention. Record 400 has six fields for storing necessary data and five fields for comments. In this embodiment, the number of comments saved for any item is a small, fixed number in order to keep the memory needs low. In alternative embodiments, the user sets the number of comments per item at startup. In this manner, a user can decide that they prefer to receive ratings for a large number of different items, with only a few comments on each or, conversely, that they choose to limit the items they are interested in rating, but prefer more comments to go along with the ratings.

Besides name 402 of the item being rated, record 400 contains a weighted rating 404 that combines all accumulated ratings, a number of users 406 counted in the weighted rating, pointer 408 to the previous record in a category, pointer 410 to the next record in a category, pointer 412 to the next comment field to be used, and a given number of comment fields 414. By using pointers 408 and 410, ratings for various items within a category, e.g. movies, do not need to be entered consecutively, yet space is not allocated until needed. Likewise, pointer 412 will point to the next comment field 416 to be written. This pointer is updated after each comment is written, so that it always points to the next available comment. When all of the comment fields are full, pointer 414 can be set back to point to the first comment field 416, so that the oldest comments are overwritten by the next comment received on this item.

In this embodiment, the policy of whether or not to receive a new input is made by performing a hash of the ratings of User B. If the hash is identical to the hash of User A, the policy does not accept this new input. If, however, the policy is met and the two users share common categories, the input from User B is added to the input accumulated by User A. Specifically, for common items, User A's record for that item is located. The number of ratings received (field 406) is incremented by one for this item, then a new weighted rating is computed using the existing weighted rating for User A (field 404), the computed value of S, and User B's weighted rating for this item. The program will then check to see if User B has comments on this item. If User B provided a comment, the comment is entered into the comment field (field 414) pointed to by the pointer (field 412) to the next comment, then the pointer (field 412) is incremented to point to the next comment to be written.

This process is repeated for each item shared in common. In categories where both users have common interest, User B may have items that do not match items in User A's information. Preferably, these items are then entered into User A's information stockpile, increasing the knowledge base. One additional point should be clarified in this regard. Because this is a distributed system, two users may rate the same item, but give it different names. For example, User A may have an item called "Campisi's Cafe", while User B has entered the same item as "Campisi's". The program is unable to recognize that these are the same item and will thus create different entries for them. In a preferred embodiment, when the user recognizes that they have several entries for the same item, the user will be able to link the two names and have their information merged.

Note that the user in this embodiment receives the accumulated ratings and comments of persons that they encounter in daily life. This increases the social relevance of the ratings, since there is a correspondence to the user's lifestyle.

Alternate Exemplary Embodiment

A first alternate embodiment of the invention is similar to the first, with a few notable changes. In this alternate embodiment, an additional field is added to the record to hold the user's own rating, which is preserved as a separate entity. Additionally, if the user makes a comment on an item, a byte in the comment field is changed to mark this as a comment that should not be overwritten. Then, when User A and User B exchange information, User A receives only the ratings and comments made by User B, not User B's accumulated ratings and comments. This alternate version increases the social relevance of the ratings, since there is no way to determine the separate relevance to User A of each of the people from whom User B has received ratings, but it does decrease the number of persons included in the ratings.

Further Exemplary Embodiment

Figure 5B:
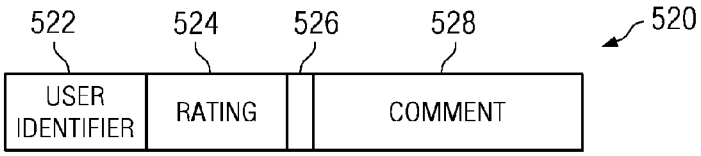
FIG. 5A discloses a semantic tree that can be used to store individual ratings, while FIG. 5B discloses a data record that can be used with the semantic tree according to an embodiment of the innovative rating program.
Figure 5A:
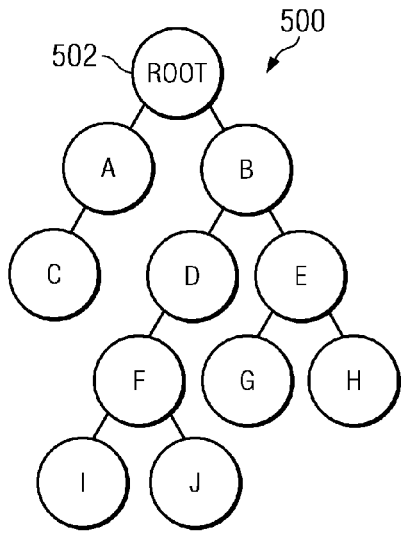

Turning now to FIG. 5A, a further alternate embodiment of the ratings program is shown. In this embodiment, rather than maintaining a single, composite rating for each item, all the accumulated individual ratings for each item are stored in a semantic tree network 500. Semantic tree networks are known in the art as a means to organize information. Each item that is rated forms the root 502 of its own semantic tree network. Each link in the tree (e.g., A, B, C, etc.) will have a weight or similarity factor. As User A receives ratings from other individuals, they are stored in the tree according to their similarity to User A. FIG. 5B shows an exemplary record 520 stored at one of the links. Record 520 contains the identification 522 of the individual providing the rating. Identification 522 can be an actual name, a pseudonym, or any other identifier, such as a serial number of the device from which the ratings were received. Record 520 also contains a rating 524 for the item and optionally, a comment 528. A one-byte field 526 indicates whether a comment is present, so that space is not wasted. A recursive process calculates a cumulative rating for each item, taking into account the weightings of the individual ratings. This embodiment provides a better weighting than the first embodiment and can accumulate ratings faster than the second embodiment above, but uses a great deal more space and processing time to maintain.

Several embodiments of the inventive method have been disclosed. Unlike present rating programs, all of the embodiments provide for the non-centralized collection of information that has an increased relevance to the user. Unlike other ratings programs, these embodiments also allow a user to request information about a subject on which the user has made no rating. The embodiments of the invention are localized to interact only in close proximity, using broadcast networking. They therefore provide for a degree of social relevance because they only receive data from those whom the user encounters.

It is important to note that while the present invention has been described in the context of a fully functioning mobile data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of collecting ratings on a plurality of subjects, said method comprising the steps of:

storing, on a portable computing device, a first set of ratings for ones of a plurality of subjects and a first set of indications of interest regarding additional ones of said plurality of subjects;

storing on the portable computing device, a policy specifying whether rating information is to be accepted through a short-range transmission device;

encountering, through the short-range transmission device, a user having a second set of ratings for ones of said plurality of subjects;

responsive to said policy being met, receiving, through said short-range transmission device, ones of said second set of ratings;

updating ones of said first set of ratings and ones of said first set of indications of interest by merging with corresponding ones of said second set of ratings wherein the updating is further configured for updating ones of said first set of ratings by calculating, for each of said ones of said first set of ratings updated, a new weighted rating based on an existing weighted rating from said first set of ratings, an existing weighted rating from said second set of ratings, and a similarity factor between said first set of ratings and said second set of rating; and displaying said updated ones of said first set of ratings.

2. The method of claim 1, wherein said merging step is performed dependent on said second set of ratings having a similarity of at least a given level to said first set of ratings.

3. The method of claim 1, further comprising the steps of broadcasting a request for ratings and responding to a broadcast of a request for ratings.

4. The method of claim 1, wherein said merging step comprises receiving a plurality of individual responses for each of ones of said plurality of subjects and storing said plurality of individual responses in a semantic tree network for said subject.

5. The method of claim 4, wherein a rating for one of said plurality of subjects is calculated by summing all collected responses in a semantic tree network for said one of said plurality of subjects.

6. The method of claim 1, wherein said merging step comprises calculating a rating by summing a first rating of said first set of ratings and a corresponding second rating of said second set of ratings, using a weighting factor.

7. The device of claim 1, wherein said policy comprises at least one of a policy to not accept input from a user that has provided input within a last period of time and a policy to receive input only during certain hours.

8. The device of claim 1, wherein said policy is entered by a user.

* * * * *